C. W. HAZELETT.
ELECTRIC BATTERY.
APPLICATION FILED MAY 9, 1919.
1,331,764.
Patented Feb. 24, 1920.
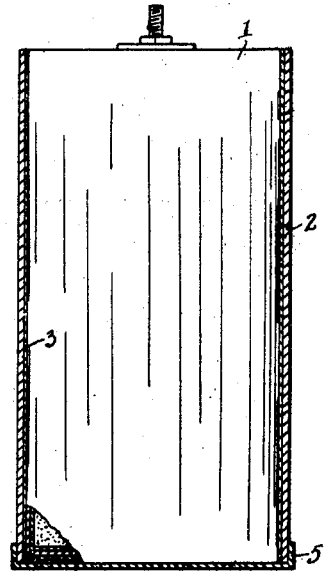
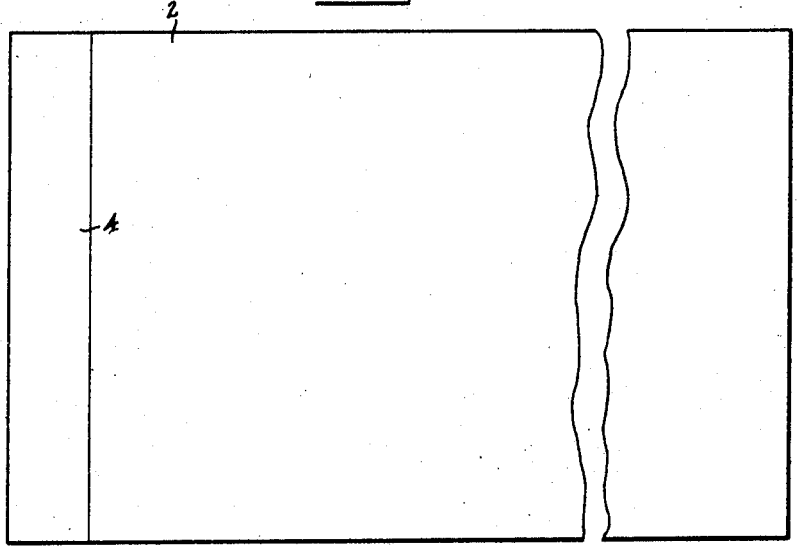
INVENTOR
C. W. HAZELETT
BY
*Ira J. Adams*
ATTORNEY

UNITED STATES PATENT OFFICE.

CLARENCE W. HAZELETT, OF LAKEWOOD, OHIO, ASSIGNOR TO NATIONAL CARBON COMPANY, INC., A CORPORATION OF NEW YORK.

ELECTRIC BATTERY.

1,331,764.

Specification of Letters Patent.

Patented Feb. 24, 1920.

Application filed May 9, 1919. Serial No. 295,990.

*To all whom it may concern:*

Be it known that I, CLARENCE W. HAZELETT, a citizen of the United States, residing at Lakewood, in the county of Cuyahoga and State of Ohio, have invented a certain new and useful Improvement in Electric Batteries, of which the following is a full, clear, and exact description.

This invention relates to dry cells and is adapted to provide means for cementing the outside jacket to the zinc can in such a way that there will be no leakage when the zinc is corroded through.

It is well known that dry cells are made by tamping an electrolyte mix around a carbon electrode inside a zinc can, there being added a layer of pitch or similar sealing material on top of the mix to prevent leakage and evaporation of electrolyte. After the dry cells are made in this way they are placed inside of tubular cartons of paper which contain the trade-marks, manufacturer's name, etc. These jackets are used, however, chiefly to insulate the zinc can from adjacent conducting objects to prevent short circuits.

Wherever the zinc corrodes through from action on shelf or from excessive useful action in certain portions of the can, the electrolyte readily escapes and depletes the mix of solution. The escape of the electrolyte also wets the surrounding jacket and quite frequently produces short circuits between adjacent cells connected together in a circuit. My improvement aims to overcome these objections by the use of coating and cementing material between the jacket and the zinc, that is capable of preventing leakage even though the zinc can is entirely eaten away. The manner in which this is accomplished will now be described, reference being had to the drawings in which:

Figure 1 illustrates a section of a cell embodying the invention.

Fig. 2 is a view showing the jacket member before being rolled around the dry cell.

To finish dry cells in accordance with my improved method, I take a zinc can 1 which preferably has been previously tamped with the electrolyzed mix and finished, as far as its contents are concerned, in the usual way. Instead of placing the cell directly in an ordinary loose jacket, I dip it in celluloid cement or equivalent material until the bottom and sides are coated all over with it. Then when the cement is still sticky, I wrap a sheet of paper such as shown at 2 in Fig. 2, around the outside of the zinc can 1 directly in contact with the cement shown at 3 in the section in Fig. 1. This forces the cement into the uneven spaces between the jacket and the can, but there will always remain at least a thin coating of cement entirely around the zinc. The paper 2 from which the jacket is made is preferably coated at 4 with any adhesive such as glue or paste, so that when the jacket is wrapped in position the overlapping edge will be joined to the other end of the zinc underneath. A paper cap 5 is then glued around the bottom of the jacket 2 and the cell is completed.

When the celluloid cements, which takes place very quickly, the jacket is tenaciously held against the zinc and a tough celluloid coating is formed around all portions of the zinc can including the bottom. A dry cell made in accordance with my improved process is water-tight and it can be used in wet places without danger of short circuits. Also, the nature of this coating around the zinc is such that it will prevent leakage of electrolyte even though the zinc is entirely eaten away.

While I have described a particular way of accomplishing the desired result, this has been by way of example only, and it will be apparent that the invention is not limited thereto. Various modifications may be used without departing from the spirit of the invention, but these need not be specifically referred to here.

Having described my invention, what I claim is:

1. The method of completing dry cells which consists in applying celluloid cement to the outside of the cell and applying a paper jacket around the cell to cause it to adhere thereto by the setting of said cement.

2. The method of completing dry cells which consists in applying celluloid cement to the outside of the cell, rolling a sheet of paper around the cell before the cement sets and adding a cap to the bottom of the jacket.

In testimony whereof I hereunto affix my signature.

C. W. HAZELETT.